March 27, 1956

W. W. NEILL ET AL 2,739,639

METHOD AND APPARATUS FOR MAKING
PUNCTURE-SEALING INNER TUBES

Filed Jan. 4, 1954

INVENTORS
WILKES W. NEILL
RUSSELL W. REED
BY
James J. Long

AGENT

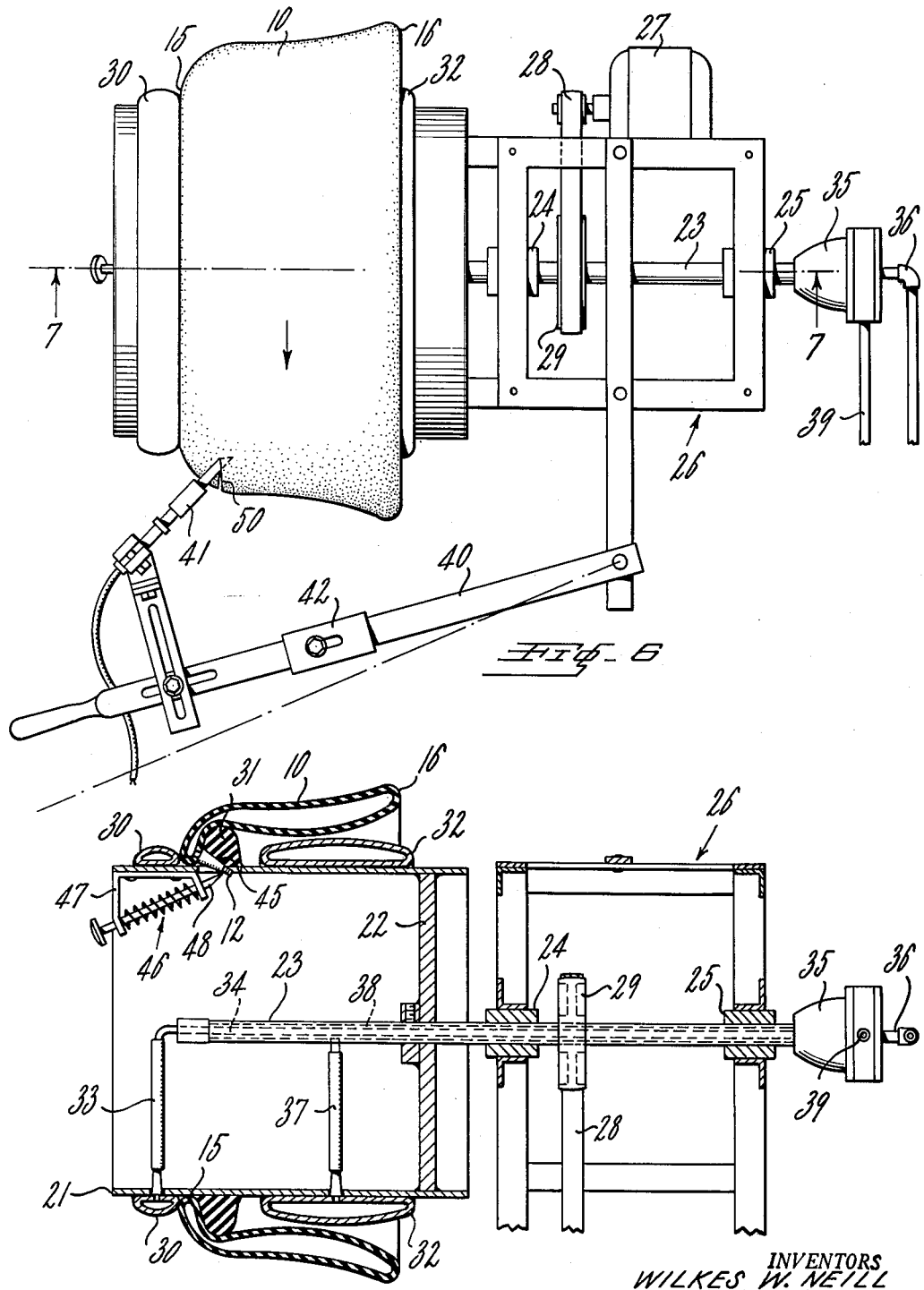

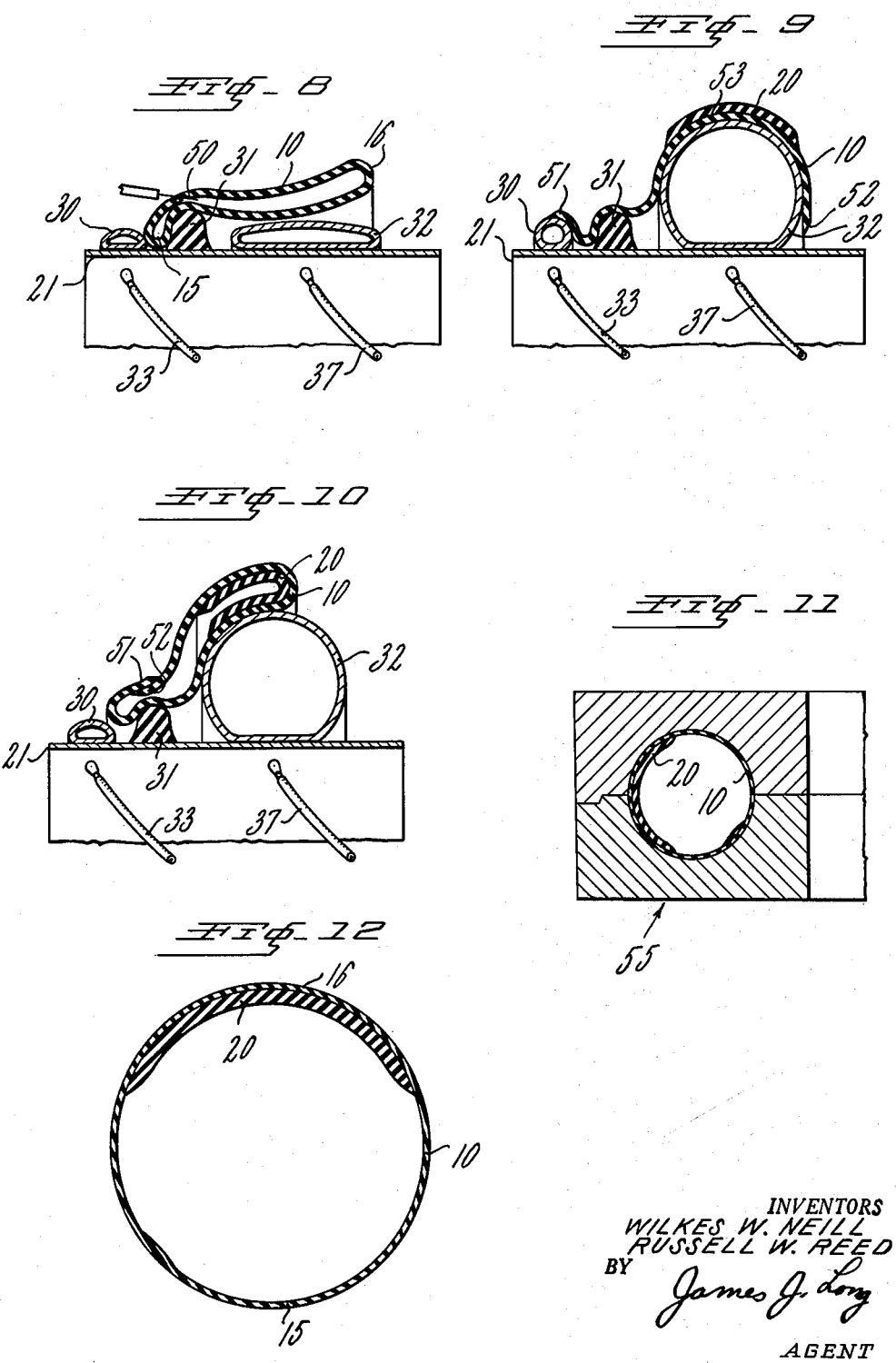

United States Patent Office 2,739,639
Patented Mar. 27, 1956

2,739,639

METHOD AND APPARATUS FOR MAKING PUNCTURE-SEALING INNER TUBES

Wilkes W. Neill and Russell W. Reed, Indianapolis, Ind., assignors to United States Rubber Company, New York, N. Y., a corporation of New Jersey Application January 4, 1954, Serial No. 402,045

5 Claims. (Cl. 154—9)

This invention relates to an improved method and apparatus for making inner tubes for pneumatic tires, embodying a puncture sealing layer of plastic material in at least the crown portion of the tube.

A principal object of the invention is to provide an improved method of making inner tubes embodying a puncture sealing layer, which does not require more than a single curing or vulcanizing cycle.

Another object is the provision of an apparatus for assembling the various parts of a puncture sealing tube more accurately and conveniently than has heretofore been possible.

The manner in which the invention accomplishes the foregoing and additional objects and advantages will be made manifest in the following detailed description, which is intended to be read with reference to the accompanying drawings, wherein:

Fig. 6 is a plan view, on a larger scale, of the tube applied to a special building apparatus;

Fig. 7 is a sectional elevational view of the building apparatus taken along line 7—7 of Fig. 6;

Figs. 8 to 10 are simplified fragmentary sectional elevational view of the apparatus and tube in subsequent steps of the process;

Fig. 11 is a cross sectional view on a smaller scale of the inner tube disposed in a vulcanizing mold; and Fig. 12 is a cross sectional view on a larger scale of the completed tube.

The invention involves first preparing an inner tube in shaped and spliced form, but still in a raw, unvulcanized condition, and slitting such raw inner tube circumferentially, whereupon a layer of plastic puncture sealing material is disposed within the tube at least over the interior crown surface. The circumferential slit is thereafter cemented and spliced and the whole assembly is disposed in a vulcanizing mold and cured in the desired shape.

The inner tube is initially formed by extruding continuous lengths of a raw vulcanizable rubber stock, such as a butyl rubber (isoolefin:diolefin low-temperature synthetic copolymer rubber, especially of the isobutylene:isoprene type) stock, which is thereafter cut into suitable lengths and butt spliced while still in a raw state, to form an annulus. The extrusion device or tuber may be of the so-called helical type, as disclosed in U. S. Patent 2,423,147 of Hinman, in which case the tube has imparted to it an inherent annular form. If a straight type of tuber is used, the raw tube, after splicing, is placed on a shaping or forming device for the purpose of imparting the desired annular form to the raw stock.

For further processing of the raw, shaped and spliced tube there is provided an annular building drum, rotatable about a horizontal axis, having a working surface on which is mounted a large inflatable annular bag and a spaced smaller inflatable annular bag, between which there is provided a rigid raised ring, all arranged in such manner as to facilitate subsequent manipulations, as will be explained in more detail below.

Figure 1:
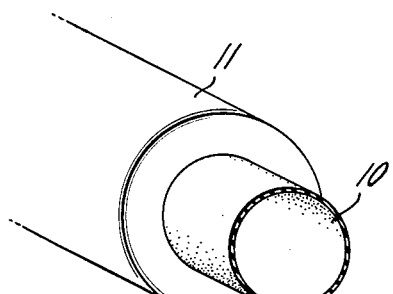
Fig. 1 is a purely diagrammatic fragmentary perspective view of a first step in forming an inner tube by extrusion in accordance with one method of practicing the invention.
Figure 2:
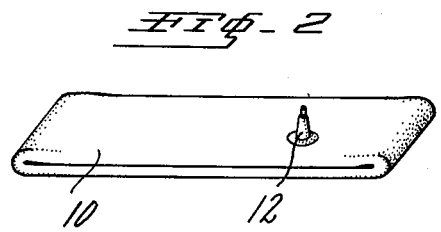
Fig. 2 is a perspective view, on a smaller scale, of the inner tube after applying a valve stem and splicing.
Figure 3:
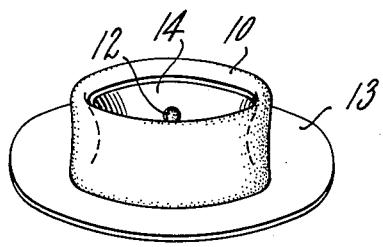
Figs. 3 and 4 are similar views showing shaping of the inner tube on a form.
Figure 4:
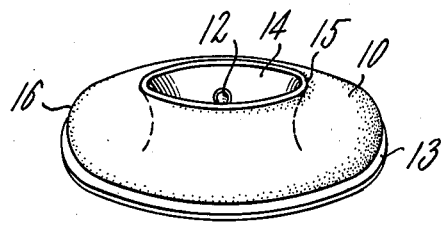
Figure 5:
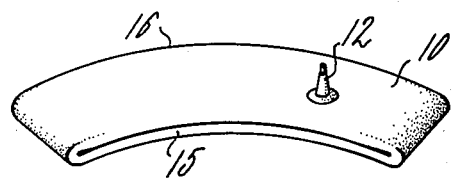
Fig. 5 is a similar view of the deflated tube after removal from the form.

Referring to the drawings, and in particular to Fig. 1, in one embodiment of the invention a raw tube 10 of vulcanizable butyl rubber stock is extruded from a conventional extruder 11, and after applying a valve stem assembly 12 to a suitable length of the tube in the usual manner, the raw tube is butt spliced to form an endless annular band, as represented in Fig. 2. Such raw tube is disposed on the usual shaping form 13 (Fig. 3) which includes an inner curved band portion 14 that serves to define the inner diameter 15 of the tube when the tube is inflated on form, as indicated in Fig. 4. As a result of thus being inflated on the form, the raw tube acquires a larger outer diameter 16 than its inner diameter 15, so that when deflated and folded it has the appearance shown in Fig. 5, wherein it will be observed that the raw tube now has the inherent shape of a frustum of a cone, whereas in Fig. 2 the deflated tube was purely cylindrical. The helical type of tuber of the Hinman Patent 2,423,147 imparts essentially a frusto-conical shape to the tube in the first instance, so that the additional shaping step on the form 13 is not necessary.

In the next stage of the process the thus-shaped raw tube is associated with a layer 20 (Figs. 9–12) of puncture sealing plastic, which is preferably based on butyl rubber. The butyl rubber sealant suitably has a slight degree of cure, so that it resists plastic flow, but it must not be cured too much, otherwise it will not perform the desired sealing function efficiently. Although such partial cure may be imparted to the butyl rubber sealant before it is incorporated in the assembly, the preferred practice in this invention is to compound the butyl rubber in such manner that it is capable of acquiring the desired partial cure during the ordinary inner tube curing cycle. A preferred method of compounding a butyl rubber sealant for such partial vulcanization is described in copending application Serial No. 359,152 of Peterson et al., filed June 2, 1953, now abandoned. Such method involves adding to 100 parts of the raw butyl rubber some 0.2 to 2.5 parts of a resinous, oil-soluble, heat-reactive 2,6-dimethylol-4-hydrocarbon phenol, that is, a resol type of resin, such as a resinous 2,6-dimethylol-4-butyl or octyl phenol, as a curing agent. From 0.3 to 5 parts of a heavy metal halide, such as ferric or stannous chloride, is included as an accelerator. Additionally, from about 20 to 150 parts of a filler such as carbon black, clay, etc., and from 8 to 50 parts of a plasticizer such a polybutene or paracumarone-indene resin are also included to provide a desired precise balance of plastic and elastic properties. Such a composition may be shaped into the form of a strip 20 (Figs. 9–12) by any suitable method, such as by extrusion or calendering.

In order to associate the strip 20 with the tube 10 there is provided a special building drum 21 (Figs. 6–7) supported by a vertical circular plate 22 (Fig. 7) extending radially from a central horizontal shaft 23 that is rotatably mounted in bearings 24, 25 carried by a supporting framework 26. A motor 27 connected to the shaft 23 by a belt 28 and pulley 29 serves for turning the drum slowly as desired. The otherwise flat outer peripheral surface or working surface of the drum is provided with a small inflatable bag or tube 30 of flexible material, such as rubberized fabric, near the outer edge of the drum surface. Slightly spaced inwardly of the small bag there is a rigid raised ring 31 having a curved outer surface. Slightly spaced inwardly of the ring there is provided a second, larger inflatable bag 32 of flexible material.

A tube 33 (Fig. 7) leads from the small bag 30 to a central pipe or duct 34 within the shaft 23 and out through a rotary coupling 35 to a pipe line 36 that may be connected to a source of air pressure or to an exhaust or vacuum as desired, by a suitable conventional valve (not shown). Similarly, a tube 37 leading from the large bag 32 to an annular passage 38 in the shaft 23 connects, through the rotary coupling 35, with an outside pipe 39 through which the large bag may be inflated with air or deflated, as desired.

A horizontal swinging arm 40 (Fig. 6) pivotally mounted on an extension of the frame 26 carries at its outer end an exactly positioned heated knife 41 which may be swung into position by the operator when desired to cut the inner tube mounted on the drum, as will be explained in more detail presently. The swinging arm 40 includes a telescoping slip joint 42 to permit the knife to be plunged into the tube when the arm is brought to the proper angular position.

In operation, the inner tube 10 is slipped over the drum 21, the small bag 30 being at this time deflated and collapsed to permit this operation. The inner diameter 15 of the inner tube is positioned in the small space provided for this purpose between the small bag and the side surface of the raised ring 31. The ring is provided with an annular inwardly extending opening 45 into which the valve stem 12 of the tube is adapted to protrude to the interior of the drum. The valve is secured in position in the opening 45 by a spring-loaded clamp 46, mounted in an angular bracket 47 on the interior surface of the drum at the outer edge thereof, and including a pointed rod 48 adapted to engage the thread of the valve stem. The rod 48 may be pulled outwardly manually against the pressure of the spring when it is desired to release the stem.

After the tube has been placed in proper position on the drum the heated knife 41 may be moved into position to make a circumferential cut 50 (Figs. 6 and 8) in the outwardly facing wall of the tube along a line slightly spaced from the inner circumference of the tube, and running along the upper surface of the rigid ring, the drum being rotated for one revolution to complete this cut. The raised ring 31 serves as a support during this operation. The angular adjustment of the knife blade is such as to prevent the knife blade point from penetrating the opposite wall of the tube. The knife blade in the penetrated position is essentially parallel to and just clears the surface of the opposite wall of the tube, as indicated in Fig. 8. The curved upper surface of the ring 31 is so shaped and positioned as to provide the proper spatial relationship between the inner tube and the knife.

The tube is then opened up in such manner that the small end 51 of the tube is laid over the small bag while the large end 52 passes over the large bag 32 at which time both bags are properly inflated as shown in Fig. 9. The inner crown surface 53 of the tube is thus now exposed and the crown of the tube is supported by the curved outer surface of the large bag 32. The inner crown surface is now prepared by buffing and cementing it, whereupon the previously provided strip 20 of sealant plastic is disposed on the thus prepared inner crown surface, as indicated in Fig. 9, and firmly spliced and stitched in place by the operator. It will be understood that all of these operations are greatly facilitated by rotating the drum as they are performed. The large bag 32 is deflated and the large end 52 is folded back over to its original position so that its edge overlies the raised ring 31.

The internal marginal area of the small end 51, supported by the inflated small bag 30, and the external marginal area of the large end 52, supported by the raised ring 31, are then prepared for splicing by buffing and applying cement thereto. The small end is then doubled back over the edge of the larger end on the raised ring to effect a lapped splice as shown in Fig. 10, and the splice is firmly stitched, the rigid ring serving as a firm support during this operation.

Upon deflation of the small bag, the tube may then be removed and disposed in the usual inner tube curing mold 55 (Fig. 11) wherein the tube is vulcanized in the final shape indicated in Fig. 12. When the sealant plastic is compounded as recommended, partial curing of this material to the precise desired extent takes place simultaneously with the full vulcanization of the tube.

It will be apparent that the foregoing method and apparatus provide a means of making a puncture sealing inner tube that does not require more than a single cure, and in which the parts are assembled conveniently and efficiently in a manner that is more satisfactory in operation and results than the previously known methods.

Having thus described our invention, what we claim and desire to protect by Letters Patent is:

1. A method of making a puncture sealing inner tube comprising in combination the steps of forming a raw inner tube of vulcanizable rubber stock, splicing the said tube to form an endless band, shaping the said tube to impart an inherent annular toroidal form thereto, slitting the spliced tube circumferentially and folding the slit edges away from each other to expose the inner crown surface of the tube, applying a preformed strip of sealant plastic to the inner crown surface of the tube, splicing the slit edges of the tube together again, disposing the resulting annular tube in an inner tube mold, and vulcanizing the tube in said mold.

2. A method of making a puncture sealing inner tube comprising in combination the steps of extruding a raw tube of vulcanizable rubber stock, butt splicing and shaping said tube to form an annular band having when deflated the inherent shape of a frustum of a cone, mounting the thus formed annular tube on an annular supporting drum provided with a raised rigid ring for supporting a portion of the tube located along a circumferential line slightly spaced from the inner circumference of the tube, inserting a heated knife through one wall only of the tube at said circumferential line while the tube is thus supported on the drum and rotating the drum to slit the said wall along the said circumferential line, opening up the thus-slit tube, buffing the thus-exposed inner crown surface of the tube, applying a preformed strip of sealant plastic to said crown surface, buffing and cementing the marginal areas of the tube at said circumferential slit, and overlapping said marginal areas on said raised supporting ring to effect a circumferential lap splice, removing from the supporting drum the tube containing on its inner crown surface said layer of sealant plastic, and vulcanizing the resulting tube in an annular mold.

3. A method of making a puncture sealing inner tube comprising in combination the steps of extruding a raw tube of vulcanizable rubber stock, butt splicing and shaping said tube to form an annular band having a relatively smaller diameter corresponding to the rim diameter of the tube and a relatively larger diameter corresponding to the crown diameter of the tube, mounting the thus formed annular tube on an annular supporting drum provided with a raised rigid ring for supporting a portion of the tube located along a circumferential line slightly spaced from the inner circumference of the tube, and provided with an inflatable annular supporting bag located to one side of the said raised ring for supporting the crown area of the tube, inserting a heated knife through the outer wall only of the tube at said circumferential line while the tube is thus supported on the drum and rotating the drum to slit the said wall along the said circumferential line, opening up the thus-slit tube with the crown surface supported on the said annular bag in an inflated condition, buffing and cementing the thus-exposed and supported inner crown surface of the tube, applying a preformed strip of sealant plastic to said crown surface, said sealant plastic being compounded for partial vulcanization, buffing and cementing the marginal areas of the tube at said circumferential slit, and overlapping said marginal areas on said raised supporting ring to effect a circumferential lap splice, removing from the supporting drum the thus assembled tube containing on its interior crown surface said layer of partially vulcanizable sealant plastic, and heating the resulting assembly in an annular mold to simultaneously vulcanize the tube and partially vulcanize the sealant layer.

4. A method of making a puncture sealing inner tube comprising in combination the steps of forming a raw inner tube of vulcanizable rubber stock in the form of an annular band having when deflated and folded the inherent shape of a frustum of a cone, mounting the thus formed annular tube on an annular drum provided with a raised rigid ring for supporting a portion of the tube located along a circumferential line slightly spaced from the inner circumference of the tube, said drum also being provided with an inflatable annular bag of flexible material disposed to one side of the rigid ring for supporting the crown area of the tube, and said drum being provided with an additional smaller inflatable annular bag of flexible material disposed on the opposite side of said raised ring from said first mentioned bag, inserting a heated knife through the upper wall only of the tube at said circumferential line while the tube is thus supported on the drum and rotating the drum to slit the said wall along the said circumferential line, opening up the thus-slit tube, with the crown surface thereof supported on the first-mentioned bag and the area near the inner diameter of the tube supported on the said smaller bag, buffing and cementing the thus-exposed inner crown surface of the tube while the underlying bag is in an inflated condition to provide support for the said crown surface, applying to the said crown surface a preformed strip of sealant plastic comprised of isobutylene-isoprene copolymer rubber compounded for partial vulcanization, deflating the bag supporting the crown area of the tube and folding such area back into its original position so that the edge of the tube associated with such portion overlies the rigid supporting ring, the remaining circumferential edge being supported on the said smaller bag in an inflated condition, buffing and cementing the marginal areas of the tube at said edges and overlapping said marginal areas on said raised supporting ring to effect a circumferential lap splice, removing from the supporting drum the thus-assembled tube containing on its inner crown surface said layer of partially vulcanizable sealant material, and heating the said assembly in an annular mold to vulcanize the tube and partially vulcanize the said sealant.

5. An apparatus for incorporating in an inner tube a preformed layer of puncture sealing plastic material comprising a rotatably supported drum, a raised rigid ring on the surface of the drum for supporting a circumferential area near the inner diameter of an inner tube having when deflated and folded the inherent shape of a frustum of a cone, a relatively large inflatable flexible bag disposed to one side of said ring for supporting the crown area of such a tube, said bag being deflatable to a collapsed position so that the crown area of the tube may be folded thereover when the tube is slit circumferentially in the area of said raised ring, and a smaller inflatable flexible bag disposed at the opposite side of said rigid ring from said first mentioned bag for supporting the edge of the tube near the inner diameter thereof when the tube is slit and folded thereover, said small bag being deflatable to a collapsed position, whereby the inner diameter of the tube may be passed over said small bag for mounting or dismounting the tube on said drum.

References Cited in the file of this patent

UNITED STATES PATENTS

| | | |
|---|---|---|
| 2,099,514 | Eberhard | Nov. 16, 1937 |
| 2,537,107 | Waber | Jan. 9, 1951 |
| 2,565,071 | Frazier | Aug. 21, 1951 |